United States Patent [19]

Delichatsios et al.

[11] Patent Number: 5,248,252

[45] Date of Patent: Sep. 28, 1993

[54] ENHANCED RADIANT OUTPUT BURNER

[75] Inventors: Michael A. Delichatsios, Lexington; John de Ris, Sharon, both of Mass.

[73] Assignee: Gas Research Institute, Chicago, Ill.

[21] Appl. No.: 906,608

[22] Filed: Jun. 30, 1992

[51] Int. Cl.⁵ ............................................. F23D 11/44
[52] U.S. Cl. ................................... 431/207; 431/11; 431/210
[58] Field of Search .................. 431/11, 10, 41, 36, 431/207, 240, 215, 208

[56] References Cited

U.S. PATENT DOCUMENTS

| | | | |
|---|---|---|---|
| 1,131,952 | 3/1915 | Peoser | 431/11 |
| 1,610,229 | 12/1926 | Atwater | 431/11 |
| 4,052,143 | 10/1977 | Sandviknes | 431/11 |
| 4,054,407 | 10/1977 | Carrubba et al. | 431/10 |
| 4,343,606 | 8/1982 | Blair et al. | 431/10 |
| 4,392,818 | 7/1983 | Wünning | 431/11 |
| 4,453,913 | 6/1984 | Gitman | 431/8 |
| 4,761,132 | 8/1988 | Khinkis | 431/10 |
| 5,002,481 | 3/1991 | Förster | 431/208 |

FOREIGN PATENT DOCUMENTS

| | | | |
|---|---|---|---|
| 1045948 | 12/1953 | France | 431/11 |
| 2131932 | 6/1984 | United Kingdom | 431/11 |

*Primary Examiner*—James C. Yeung
*Attorney, Agent, or Firm*—Speckman, Pauley & Fejer

[57] ABSTRACT

A process and apparatus for combustion of a gaseous fuel in which the gaseous fuel is preheated to form soot. The soot is mixed with an oxidant, the resulting soot/oxidant mixture being ignited to form a highly luminous flame.

4 Claims, 2 Drawing Sheets

ENHANCED RADIANT OUTPUT BURNER

BACKGROUND OF THE INVENTION

1. Field Of The Invention

This invention relates to a process and apparatus for increasing radiative heat transfer in a gaseous fuel burner, in particular, a natural gas fired burner.

2. Description of the Prior Art

A significant increase in the efficiency of industrial furnaces burning natural gas is achieved by increasing the radiative heat transfer from the natural gas flame. Three parameters which control radiative heat transfer are 1) temperature in the furnace, 2) concentrations of radiating $H_2O$, $CO_2$ gaseous species in the furnace and 3) the volume of the furnace. Temperature in the furnace as well as concentrations of radiating $H_2O$, $CO_2$ gaseous species within the furnace can be increased by enrichment of the combustion air with oxygen. Increasing combustion products and furnace volume results in higher emissivities in furnaces while burning natural gas in an oxygen-rich environment increases gas temperatures.

A significant increase in efficiency, however, is also effected by the introduction of soot into the flames which burns completely within the flame envelope resulting in extraction of a large fraction, on the order of 30%, of the heat input by radiation. Because soot is a much more effective "radiator" than gaseous combustion products, smaller furnace volumes are required to obtain emissivities approaching unity. In addition, this approach is more advantageous than oxygen-enriched combustion because the increased efficiency resulting from the increase in radiative heat transfer is achieved at lower temperatures than oxygen-enriched combustion which, in turn, produces lower $NO_x$ emissions than oxygen-enriched combustion systems in which $NO_x$ emissions are known to increase significantly.

Several methods for generating soot in the combustion of natural gas are known, the simplest of which is the combustion of natural gas in stages where the first stage combustion is carried out under fuel-rich conditions to produce soot which is combined with additional oxidant in a second stage to complete combustion of the fuel. The flame produced in the second stage is a highly luminous flame. Such a process is taught by U.S. Pat. No. 4,761,132.

U.S. Pat. No. 4,343,606 teaches a multi-stage combustion process for fuels containing fixed-nitrogen chemical species in which the fuel and a portion of an oxidizing agent are mixed and partially combusted in the first stage of the process at a temperature of about 1,850° to about 2,150° K. and the resulting combustion products are mixed with a second portion of oxidizing agent and completely combusted in the second stage of the process. Similarly, U.S. Pat. No. 4,054,407 teaches a multi-stage combustion process for nitrogen-containing fuels in which a first fuel/air mixture is combusted in the presence of a catalyst in a first fuel-rich stage and additional air is added to the combustion products from the first stage to fully combust the products of combustion from the first stage.

U.S Pat. No. 4,453,913 teaches a burner with two independent combustion stages, the burner having a pair of concentrically disposed burner tubes, a fuel-rich fuel/air mixture being supplied to the inner tube and a fuel-lean fuel/air mixture being provided to the outer tube.

U.S. Pat. No. 4,392,818 teaches a heat recuperation burner in which a fuel supply tube is concentrically surrounded by an air supply tube defining an annular space into which combustion air is supplied. Combustion air passing through the annular space is preheated by a heat exchanger carrying exhaust gases.

Finally, U.S. Pat. No. 5,002,481 teaches an apparatus for producing a combustible gaseous mixture of superheated steam, fuel vapor and combustion air in which the fuel is vaporized in a stream of superheated steam within a heat exchange coil mounted within a combustion chamber. The mixture of superheated steam, fuel vapor and combustion air is then burned. The hot effluent from the apparatus is used to heat the heat exchange coil and an air preheating chamber which is also mounted within the combustion chamber.

SUMMARY OF THE INVENTION

It is an object of this invention to provide a process for increasing the radiative heat transfer from gaseous fuel fired burners, in particular, natural gas fired burners which produce turbulent diffusion flames, as well as providing complete combustion of the fuel.

It is yet another object of this invention to provide a process for combustion of a gaseous fuel which produces a turbulent diffusion flame having a high radiation output and reduced $NO_x$ emissions.

It is another object of this invention to provide a single stage combustion process for increasing the radiation output in turbulent diffusion flames from gaseous fuel fired burners.

It is yet another object of this invention to provide an apparatus for combustion of a gaseous fuel which provides an increase in radiative output from a turbulent diffusion flame.

These and other objects are achieved in a process for combustion of a gaseous fuel in accordance with one embodiment of this invention in which the gaseous fuel is preheated, partially decomposing to form soot, the soot, together with any remaining portion of preheated gaseous fuel and other components generated by the preheating of the gaseous fuel, is mixed with an oxidant, and the resulting soot/gaseous fuel/oxidant mixture is ignited, forming a highly luminous turbulent diffusion flame. It is to be noted that premixing of the fuel and oxidant as suggested by the prior art has virtually no effect on the process of this invention.

In accordance with a preferred embodiment of this invention, the gaseous fuel is preheated to a temperature in a range of about 1,100° K. to about 1,800° K. Within this temperature range, soot particles, which contribute to a significant increase in flame radiation before they burn out completely inside a flame, are formed. At fuel preheat temperatures in excess of 1,800° K., soot particles are formed, but the benefits in terms of radiant output from the resulting flame do not increase correspondingly. In addition, although soot particles are formed at temperatures below about 1,100° K. as well, the benefits derived from preheating the gaseous fuel, in terms of radiant output, increase substantially faster at fuel preheat temperatures above about 1,100° K. as compared to fuel preheat temperatures below 1,100° K.

In accordance with one embodiment of this invention, the oxidant, preferably, air, oxygen or mixtures thereof, is preheated, preferably to a temperature less than about 500° K. Preheating the oxidant in accordance with this embodiment of the invention has been shown to increase radiant output from the turbulent diffusion flame generated by the process of this invention compared to oxidant at ambient temperatures while maintaining $NO_x$ emissions at very low levels. In addition, the use of oxygen-enriched combustion air has also been shown to increase radiant output from the turbulent diffusion flame generated by the process of this invention compared to combustion air alone.

In a particularly preferred embodiment of the process of this invention, soot formed by preheating the gaseous fuel is mixed with at least a stoichiometric requirement of an oxidant. That is, at least all of the oxidant required for complete combustion of the gaseous fuel is mixed with the soot formed by preheating of the gaseous fuel. The amount of oxidant which may be employed in the process of this invention for combustion of the fuel is between about the stoichiometric requirement for complete combustion of the fuel and about 600% excess oxidant. It will be apparent to those skilled in the art that not all of the gaseous fuel which is preheated forms soot. Thus, the soot/oxidant mixture resulting from mixing of the soot with the oxidant also comprises a portion of the gaseous fuel, water, and other compounds.

An apparatus for combustion of a gaseous fuel in accordance with one embodiment of this invention comprises means for preheating the gaseous fuel to form soot, means for mixing an oxidant with the soot, and means for igniting the resulting soot/oxidant mixture. In accordance with one embodiment of this invention, said apparatus further comprises means for preheating the oxidant prior to mixing with the soot.

We have determined that the products o combustion resulting from the process of this invention are not sufficient to preheat the gaseous fuel to the temperatures required for forming soot. Accordingly, the apparatus for combustion of a gaseous fuel in accordance with one embodiment of this invention comprises an auxiliary heat source, such as a separate burner generating high temperature products of combustion, in thermal communication with the gaseous fuel. However, to preheat the oxidant, the apparatus for combustion of a gaseous fuel in accordance with one embodiment of this invention comprises means for recirculating the products of combustion from the apparatus in thermal communication with the oxidant.

In a particularly preferred embodiment of the apparatus of this invention, the thermal communication between the auxiliary heat source and the gaseous fuel for preheating the gaseous fuel comprises a counterflow shell and tube heat exchanger through which the gaseous fuel flows in heat exchange relationship with the heated fluid produced by the auxiliary heat source.

Although the gaseous fuel preferred for use in the process and apparatus of this invention is natural gas, other gaseous fuels, including ethane and propane, may also be used. Preheating such gaseous fuels in accordance with the process and apparatus of this invention correspondingly increases the radiant output of the resulting turbulent diffusion flames.

BRIEF DESCRIPTION OF THE DRAWINGS

These and other features of this invention will be better understood from the following detailed description in conjunction with the figures, wherein.

DESCRIPTION OF PREFERRED EMBODIMENTS

Figure 1:
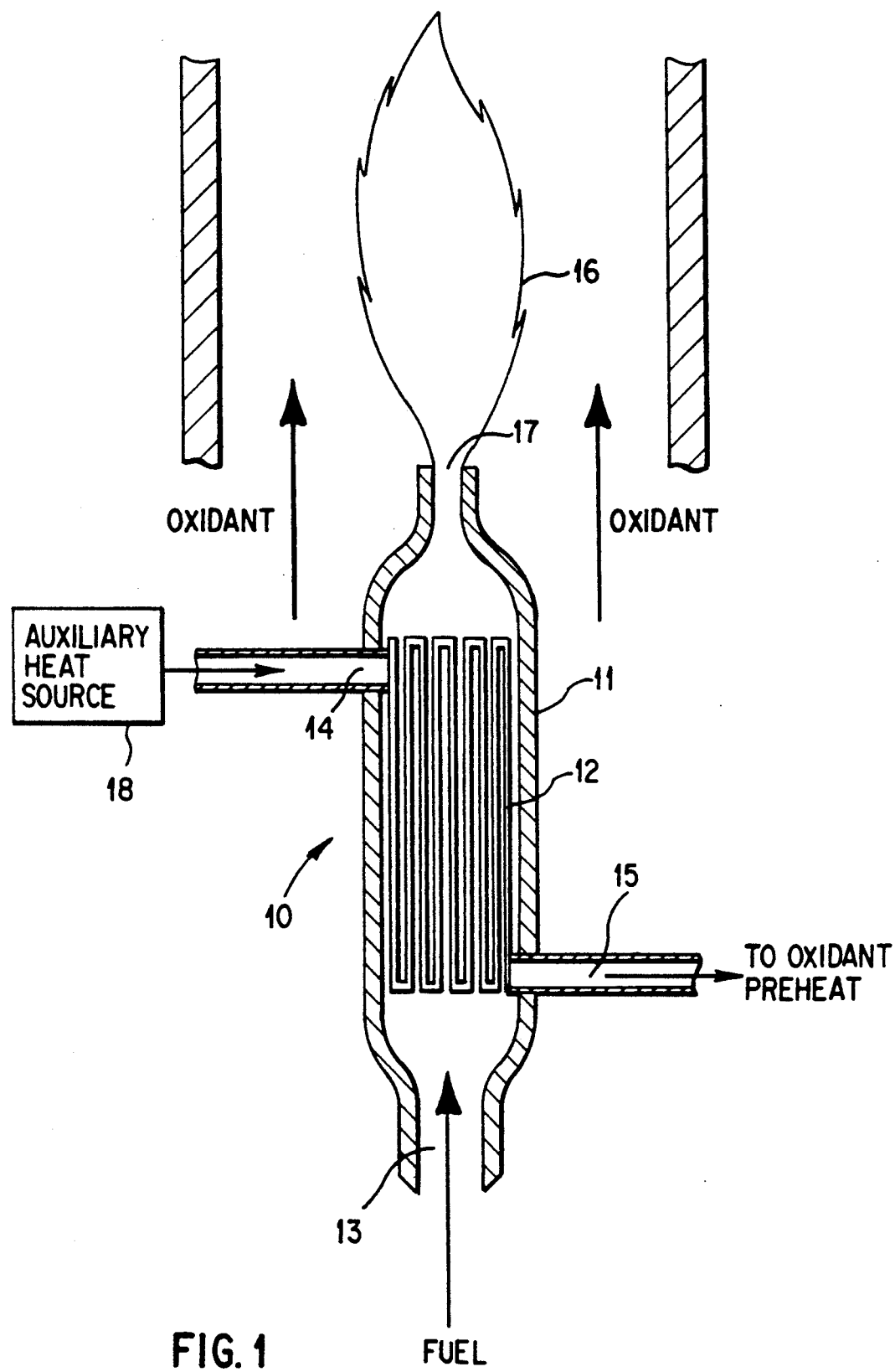
FIG. 1 is a schematic diagram of a gaseous fuel burner in accordance with one embodiment of this invention.

FIG. 1 is a schematic diagram of an apparatus in accordance with one embodiment of this invention for combustion of a gaseous fuel which produces a turbulent diffusion flame having a radiant output substantially higher than the radiant output from known gaseous fuel burners. Indeed, radiant output from a natural gas burner utilizing the process of this invention can be increased from about 10% to more than 40%, depending on the flow momentum, of the heat release rate. Even greater increases in radiant output can be obtained by a) oxygen enrichment of the oxidant, preferably combustion air, b) preheating of the combustion air, and c) increases in gaseous fuel pressure. In addition, design parameters can be selected such that minimal smoke emerges from the apparatus and minimal $NO_x$ is formed.

In accordance with one embodiment of this invention, burner 10 comprises means for preheating a gaseous fuel to form soot, means for mixing an oxidant with the soot, and means for igniting the soot/oxidant mixture. As shown in FIG. 1, said means for preheating said gaseous fuel to form soot in accordance with one embodiment of this invention comprises a shell and tube heat exchanger comprising shell 11 and tubes 12 disposed inside of shell 11. Shell 11 is provided with fuel inlet 13 through which a gaseous fuel, preferably natural gas, is introduced into shell 11. As the gaseous fuel flows through shell 11, it comes in contact with the outer surfaces of tubes 12 containing a heated fluid provided to tubes 12 through preheat fluid inlet 14 and exhausted from tubes 12 through preheat fluid outlet 15. As shown in FIG. 1, the gaseous fuel is in counterflow relationship with the preheat fluid passing through tubes 12. As a result, the gaseous fuel is preheated to form soot particles as the gaseous fuel is exhausted from shell 11 through fuel outlet 17. The soot particles thus formed combine with oxidant to form a soot/oxidant mixture which is subsequently ignited to form turbulent diffusion flame 16.

The temperature of the gaseous fuel exiting shell 11 is preferably between 1,100° K. and 1,800° K. It has been discovered that at least a portion of the gaseous fuel within this temperature range forms soot particles at fuel outlet 17 of shell 11. Said soot particles are burned within flame 16, thereby producing a substantial amount of radiant output from flame 16.

To provide the heat required for preheating the gaseous fuel, auxiliary heat source 18 is provided in communication with tubes 12. In accordance with a preferred embodiment of this invention, high temperature combustion products from an auxiliary burner provide the necessary heat for preheating the gaseous fuel. It will be apparent to those skilled in the art that other auxiliary heat sources may also be suitable for this purpose. However, it is generally the case that the combustion products produced by combustion of the gaseous fuel in burner 10 do not contain sufficient heat for purposes of preheating the gaseous fuel.

Due to the high temperatures to which the gaseous fuel is preheated, ceramic materials are preferred for construction of the shell and tube counterflow heat exchanger.

To ensure proper functioning of the apparatus in accordance with this invention, in particular, to ensure that the soot formed by preheating of the gaseous fuel does not collect in fuel outlet 17 of shell 11, thereby plugging the apparatus, fuel preheat must be carried out in a controlled fashion. In particular, residence time of the fuel within burner 10 is critical to the formation of soot within burner 10. In tests of the concept of this invention, at a 27 kW heat release rate, a residence time for the fuel of 58 milliseconds at a fuel preheat temperature of 1,500° K. was sufficient to prevent formation of soot within the experimental burner. In general, the residence time or velocity of the fuel in the burner must be such that soot formed by preheating the fuel does not collect in the burner. Such parameters will be defined by the dimensions of the burner used and thus will vary from burner to burner.

Figure 2:
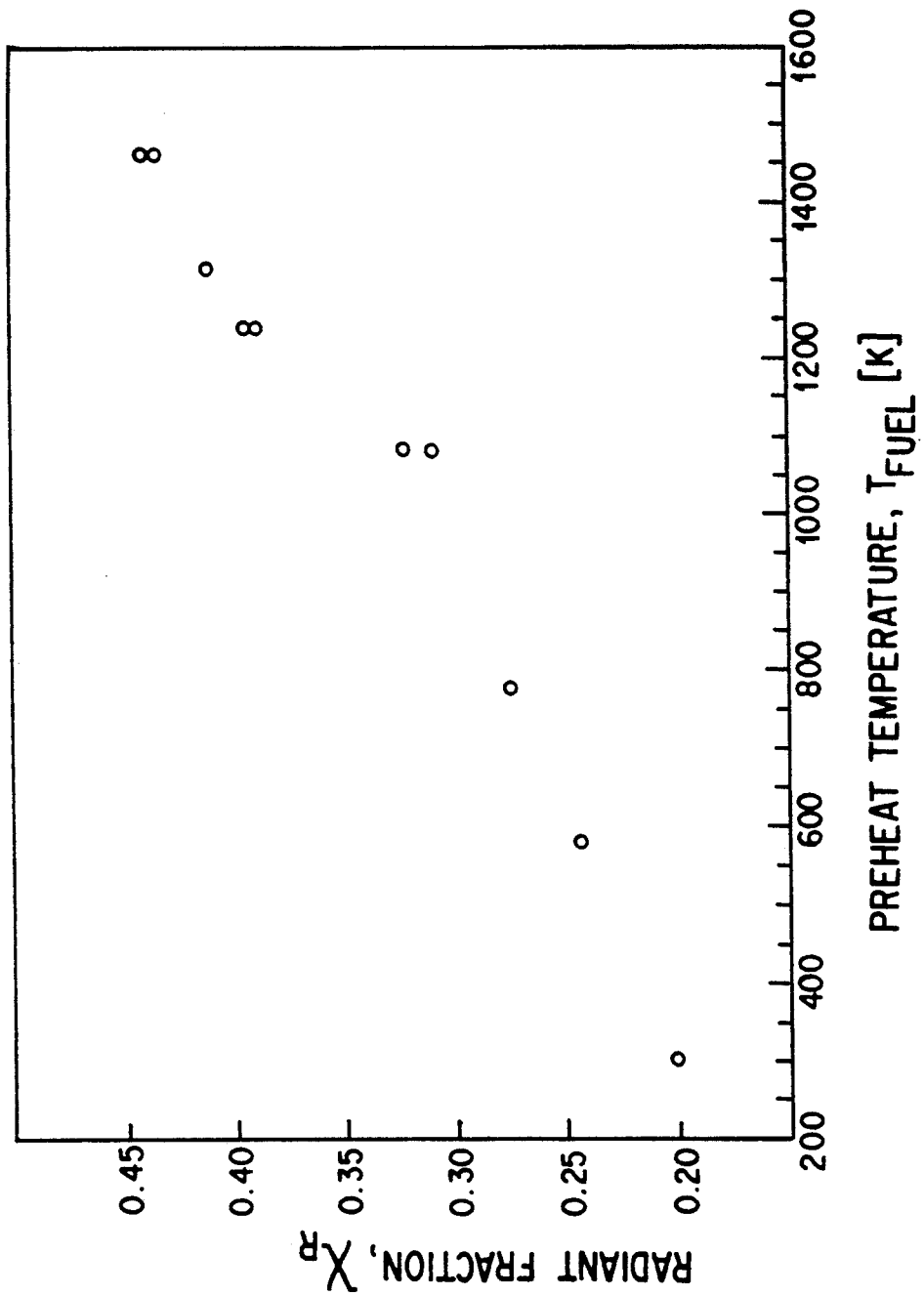
FIG. 2 is a graphic diagram showing the relationship between radiant output and fuel preheat temperature.

FIG. 2 shows the effect of fuel preheat temperature on the radiant fraction of heat released by a gaseous fuel flame. It is known that flame radiation in turbulent diffusion flame 16 depends on the flame volume, an effective flame temperature and the flame emissivity which consists of gaseous and soot contributions. Gaseous radiation in luminous turbulent diffusion flames is a small fraction of the total radiation output. For example, purely non-luminous flames radiate about 15% or less of their output as radiation when they burn as buoyancy dominated flames. In luminous flames, that is, flames having a radiant fraction greater than about 0.2, the contribution of gaseous radiation becomes even smaller due to the decreases in effective radiative temperature resulting from the much higher radiant losses. From FIG. 2, it is apparent that the radiant fraction which is defined as the ratio of the total radiant output from the flame divided by the theoretical heat release rate from the flame increases at a faster rate at preheat temperatures greater than about 1,100° K., this faster rate of increase continuing to a fuel preheat temperature in excess of 1,400° K. It is also apparent that oxygen enrichment of the combustion air can increase the radiant output of the flame.

However, experiments have also shown that the radiant fraction ceases to increase with corresponding increases in soot concentration of the fuel, at which point the radiant fraction depends only on the adiabatic flame temperature of the flame. This is known a the "soot radiation" saturation limit. As the soot loading increases inside the flame due to formation of soot in the fuel, the effective flame temperature near the tip of the flame is reduced by radiant cooling to a level of about 1,500° K. At or below this temperature, soot oxidation cannot be sustained. Thus, an increase in soot loading above the soot loading which produces this condition, that is, flame temperature near the flame tip of about 1,500° K., will not contribute to a further increase of the radiant fraction, but rather will emerge as unburned smoke.

In conclusion, we have determined that the incremental increase in the radiant fraction of heat release from a gaseous fuel flame becomes smaller as the preheat temperature of the fuel increases. This is particularly true at temperatures above about 1,500° K. As the fuel is preheated at higher temperatures, an increased amount of soot is formed and can be observed as smoke flowing out of the flames. At this point, "soot radiation" saturation conditions exist and the radiant fraction attains a maximum value depending on the adiabatic flame temperature. It is important to note that fuel preheating enhances flame radiation by primarily promoting and increasing soot formation while at the same time causing only a relatively small increase in adiabatic flame temperature. Thus, as the flame radiation fraction increases, the actual flame temperature decreases, until, at soot saturation conditions, flame quenching occurs near the tip of the flames and smoke is released. As a result, the reduction in flame temperatures due to the considerable radiation cooling results in reduced $NO_x$ emissions.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein ca be varied considerably without departing from the basic principles of the invention.

We claim:

1. An apparatus for combustion of a gaseous fuel comprising:

gaseous fuel preheat means for preheating said gaseous fuel to form soot, said gaseous fuel preheat means comprising a counterflow shell and tube heat exchanger through which said gaseous fuel flows in heat exchange relationship with a heated fluid produced by an auxiliary heat source;

means for mixing an oxidant with said soot; and means for igniting said soot/oxidant mixture.

2. An apparatus for combustion of a gaseous fuel in accordance with claim 1 further comprising means for preheating said oxidant.

3. An apparatus for combustion of a gaseous fuel in accordance with claim 2, wherein said means for preheating said oxidant comprises means for recirculating the products of combustion in thermal communication with said oxidant.

4. An apparatus for combustion of a gaseous fuel in accordance with claim 1, wherein said counterflow shell and tube heat exchanger is constructed of a ceramic material.

* * * * *